United States Patent [19]

Majestic

[11] Patent Number: 4,527,035
[45] Date of Patent: Jul. 2, 1985

[54] WIRE ELECTRICAL DISCHARGE MACHINE FLUSHING PROCESS AND APPARATUS

[75] Inventor: Peter J. Majestic, Corning, N.Y.
[73] Assignee: Corning Glass Works, Corning, N.Y.
[21] Appl. No.: 542,544
[22] Filed: Oct. 17, 1983

Related U.S. Application Data

[63] Continuation of Ser. No. 288,390, Jul. 30, 1981, abandoned.

[51] Int. Cl.³ .............................................. B23P 1/08
[52] U.S. Cl. ................................ 219/69 W; 219/69 D
[58] Field of Search ............. 219/69 M, 69 D, 69 R, 219/69 W, 69 E; 204/129.1, 129.6, 129.7

[56] References Cited

U.S. PATENT DOCUMENTS

| | | | |
|---|---|---|---|
| 3,493,710 | 2/1970 | Moore | 219/69 W |
| 3,962,557 | 6/1976 | Buck | 219/69 D |
| 4,263,493 | 4/1981 | Kilcher | 219/69 D |
| 4,459,454 | 7/1984 | Inoue | 219/69 D |

FOREIGN PATENT DOCUMENTS 2018662 10/1979 United Kingdom ............. 219/69 D

*Primary Examiner*—M. H. Paschall
*Attorney, Agent, or Firm*—B. R. Turner

[57] ABSTRACT

Method and apparatus are set forth for forming a substantially enclosed longitudinal path along the cutting surface of a workpiece and substantially enclosing a cutting wire of electrical discharge machining equipment so as to confine and direct dielectric fluid supplied thereto along such cutting wire to flush out eroded particles formed during the cutting of a slot in the surface of the workpiece.

8 Claims, 6 Drawing Figures

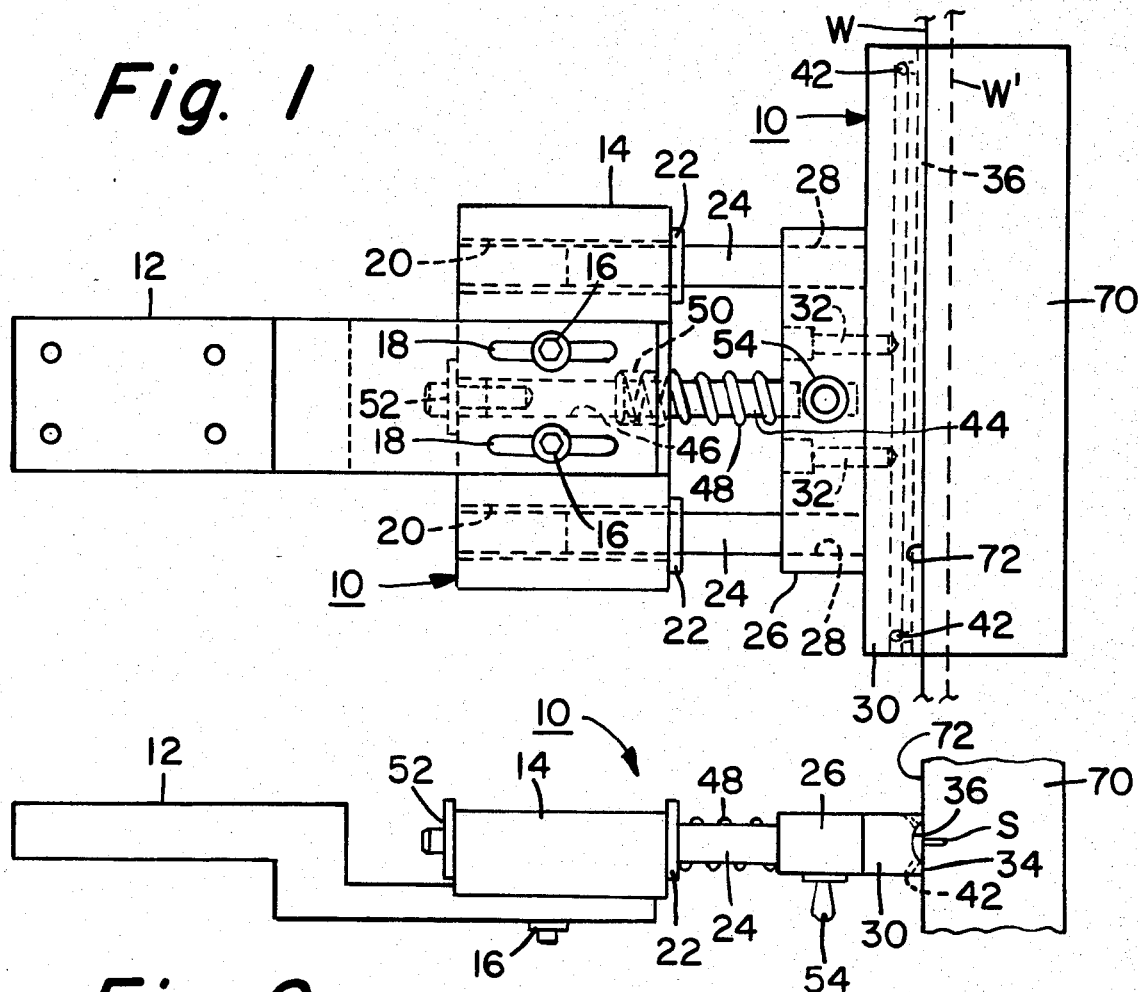
Fig. 1
Fig. 2
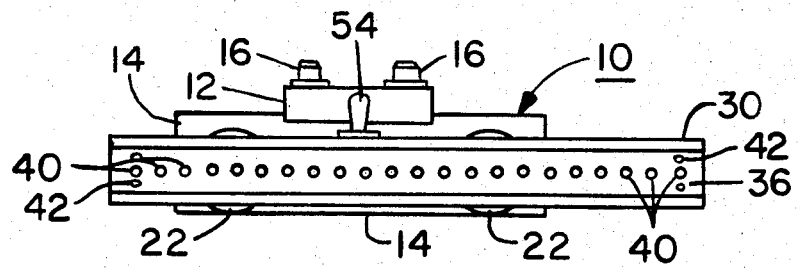
Fig. 3
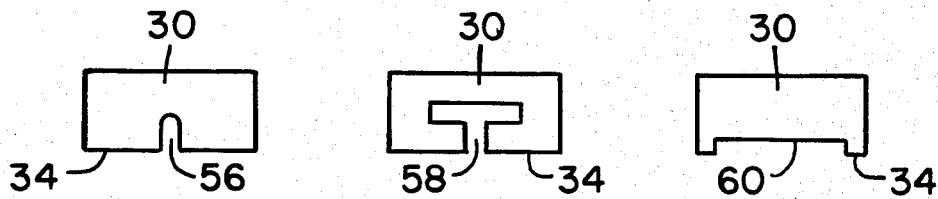
Fig. 4   Fig. 5   Fig. 6

WIRE ELECTRICAL DISCHARGE MACHINE FLUSHING PROCESS AND APPARATUS

This is a continuation of application Ser. No. 288,390, filed July 30, 1981 now abandoned.

BACKGROUND OF THE INVENTION

Conventional wire electrical discharge machining (EDM) equipment includes a head assembly mounted on a machine tool body and a numerically controlled positioning table. The wire equipment contains a spool assembly on which a fine wire is held taut between two spools. The drive spool moves the wire at a fixed rate from one spool to another with the useable work length between the two spools being about 4" to 8". The cutting rate depends upon the wire size and the amperage carried by the wire, plus the feed rate set for the depth of the cut. Deionized water is not only normally used as the dielectric, but also functions to flush out eroded particles produced during the cutting action. As is typical with all EDM operations, the wire electrode produces a uniform overcut or overburn which may be on the order of about 0.002" to 0.003" over the diameter of the electrode.

In the extrusion forming of ceramic honeycomb structures used in catalytic converters for internal combustion engines, it is necessary to form extrusion dies with substantially long, thin slots which are not only straight and extend across the face of the die, but which also have parallel sidewalls, are burr-free and have consistent surface finish. In addition, such long, thin slots should have a length greater than about 3½", a depth in excess of about 0.06", and a width not greater than 0.012".

Known EDM wire processes, such as disclosed in U.S. Pat. Nos. 2,526,423; 4,205,213; and 4,233,486, are all capable of producing slots, however, such processes have a limited effective depth of slot which can be cut with a given wire diameter over a length of 3½" or more within the surface of the workpiece. That is, for example, the difficulty encountered with known EDM wire processes of flushing out the eroded particles from within small slots during the cutting process, limits the effective depth of the cut. As the wire cutting process stalls, due to a buildup of eroded particles, the slot width becomes materially enlarged or unduly "overcut" at such depth, thus producing uneven slots.

Most EDM wire processes utilize a longitudinal or coaxial method of flushing wherein the deionized water is applied longitudinally along or coaxially of the wire making the longitudinal cut or slot in the workpiece. However, when machining such a longitudinal slot utilizing the wire process, the coaxially applied flushing media is deflected by the edge of the workpiece, and accordingly, the deflection of the dielectric often causes an inefficiency or breakdown in the cutting process. An inefficient machining condition is exhibited when the machine repeatedly backs away from the cutting surface and discontinues sparking, or when orange sparks are observed in the cutting area, or when persistent wire breakage occurs. As previously mentioned, such inefficient machining conditions not only seriously affect the ability to machine a slot to a given desired depth, but also "repeatability," which is the ability to consistently form identical slots, is virtually lost. Further, it has been found that a widening or bellmouth condition often occurs at the entrance of the slot adjacent the work surface when cutting with conventional EDM wire processes.

The present invention overcomes the problems encountered with known EDM wire processes and apparatus and permits the repeatable formation of a plurality of long, thin slots having parallel sidewalls with consistent surface finish and a depth in excess of 0.6" and a length of 3½" or greater.

SUMMARY OF THE INVENTION

In its simplest form, the present invention relates to the utilization of a longitudinal path within which the EDM wire travels along the length of the cutting surface of the workpiece. Although open at each end, the path is substantially closed along its extent so as to direct the flow of dielectric fluid along the longitudinal path about the EDM wire over the extent of the cutting surface of the workpiece. The enclosed longitudinal path may be formed by a flushing device or trough having a longitudinal channel formed therein positioned against the cutting surface of the workpiece.

BRIEF DESCRIPTION OF THE DRAWINGS

FIG. 1 is a side elevational view of a flushing device or trough of the present invention positioned against the cutting surface of a workpiece.

FIG. 2 is a top plan view of the device shown in FIG. 1.

FIG. 3 is a front elevational view rotated 90° of the device shown in FIG. 1, but with the workpiece removed.

FIGS. 4, 5, and 6 are schematic top plan views of various channel configurations which may be utilized in the trough member shown in FIG. 1.

DESCRIPTION OF THE PREFERRED EMBODIMENTS

Referring now to the drawings, and particularly FIGS. 1, 2 and 3, a flushing device or trough assembly 10 for a wire EDM operation is shown positioned adjacent a cutting surface 72 of a workpiece 70. The trough assembly 10 includes a mounting bracket 12 for mounting the assembly on a supporting structure (not shown) of a wire EDM machine. A guide block 14 is adjustably mounted upon the mounting bracket by means of cap screws 16 projecting through slots 18 formed in the mounting bracket 12. The guide block has a pair of outwardly positioned upper and lower bores 20 provided with flanged bearing members 22 for slideably receiving guide pins 24. The guide pins 24 are secured to a plunger block 26 within recesses 28. The plunger block 26 is bolted to a trough member or containment block 30 such as by screws or bolts 32.

The forward face 34 of the trough 30 is provided with a recess or channel 36 along its longitudinal extent which is open to forward face 34 and at the longitudinal top and bottom ends of the trough member 30 which are adjacent terminating edges of the cutting surface 72. If desired, a passageway 38 may be formed within the trough 30 and provided with a plurality of openings 40 which communicate with the channel 36 to provide transverse flushing of the wire cutting area. In addition, a plurality of vents or drain passages 42 may be provided within the trough or containment block 30 which communicates between the channel 36 and an outer surface of the block so as to facilitate the draining or venting of excess flushing fluid from the channel.

A wire W such as utilized with a standard wire EDM apparatus is shown as a solid line in FIG. 1 at its initital position adjacent the cutting surface 72 of the workpiece 70, and is shown as a broken line W' in a cutting position such as for forming slot S shown in FIG. 2. It will be noted, that a longitudinal path is formed about the wire by the channel 36 and the slot S so as to direct the axial flow of dielectric flushing fluid along the longitudinal length of the wire and thereby remove and flush out eroded particles from within the small slots machined by the wire.

The forward face 34 of the trough 30 is retained against the cutting surface 72 of the workpiece 70 to contain the dielectric fluid in a longitudinal or axial path around the wire during the cutting cycle. A guide pin 44 is secured to the plunger block 26 and projects within a bore 46 formed within the guide block 14, and a spring 48 which is seated at the end of a counterbore 50 within guide block 14 is positioned about guide pin 44 and abuts a rear surface of the plunger block 26 to urge the trough or containment block 30 outwardly into operable engagement with the cutting surface 72 of the workpiece 70. A stop washer assembly 52 is secured to the rearward end of the guide pin 44 to limit the forward movement of the plunger block 26 with respect to guide block 14. A finger control handle 54 extends outwardly from the plunger block 26 for manually sliding the trough 30 away from and toward the workpiece 70. Although the channel 36 is shown in FIG. 2 as having an arcuate configuration, the channel of trough 30 may have a counterbore configuration 56 as shown in FIG. 4, a T-shaped configuration 58 as shown in FIG. 5, or a rectangular configuration 60 as shown in FIG. 6.

The longitudinal path formed by the channel and the slot around the wire aids in flushing unwanted particles from the cutting area so as to facilitate the provision of long, thin slots having parallel sidewalls with consistent surface finish. As a specific example, the rectangular channel 60 formed in trough 30 may have a channel depth of about 0.05" and a width of about 0.5". The length of the channel, independently of its configuration, is substantially equivalent to the length of the cutting surface in which the cut is being machined. Without utilizing the trough of the present invention, process interruptions when machining with molybdenum wire could be anticipated to occur anywhere between about 0.01" penetration and 0.06" penetration, with the maximum penetration seldom exceeding 0.06". When utilizing the T-shaped channel as shown in FIG. 5, a mean penetration of 0.012" could be realized when utilizing a 0.004" diameter molybdenum wire while a mean depth of about 0.118" could be realized when utilizing the counterbore channel configuration as shown in FIG. 4.

With the application of the trough of the present invention, quality slots may be formed in a die face having 6¾" and 8" cutting surfaces, by utilizing 0.007" and 0.008" diameter brass wires and the curved channel of FIG. 2 or the rectangular channel of FIG. 6 having a depth of about 0.05" and a width of about 0.5". The standard deviation of the slot size ranges between about 0.002" and 0.006", depending upon the material utilized and the quality of the workpiece. These results demonstrate that the use of the troughs of the present invention enable the workpiece to be machined significantly deeper and with consistent parallel surface finish over that which is obtainable without the utilization of the present invention.

The use of side flushing, such as through openings 40, in conjunction with the axial flushing may be utilized if desired, particularly with fine molybdenum wire applications. A significant increase in penetration may be realized utilizing this technique, although it may not prove to be necessary with all wire applications.

Although I have disclosed the now preferred embodiments of the invention, it will be apparent to those skilled in the art that various changes and modifications may be made thereto without departing from the spirit and scope thereof as defined in the appended claims.

I claim:

1. A method of forming a slot in a workpiece utilizing a wire cutting electrical discharge machining process which comprises, providing a workpiece having an exterior surface to be cut along its entire extent, positioning an electrical discharge machining wire have an axis adjacent the extent of said exterior surface to be cut with the axis of the wire parallel to the extent of said exterior surface, providing a substantially enclosed longitudinal path about said cutting wire externally of and along the extent of said exterior surface to be cut with said path being open at end portions adjacent terminating edges of said surface by positioning a trough member having a channel formed in a forward surface in operable engagement with the exterior surface of said workpiece to be cut such that said electrical discharge machining wire is positioned within the channel formed in said trough said wire axis extending along said channel to run along the extent of the exterior surface, applying fluid to said path and directing such fluid longitudinally along said substantially enclosed longitudinal path about said cutting wire, and flushing out eroded particles formed during the cutting of a slot in the surface of the workpiece.

2. A method of forming a slot in a workpiece as defined in claim 1 including the step of applying a dielectric fluid to said longitudinal path transversely of said path.

3. A method of forming a slot in a workpiece as defined in claim 1, including the step of providing means for draining said fluid applied to said longitudinal path transversely of said path intermediate its open ends.

4. Apparatus for use with wire cutting electrical discharge machining equipment wherein a slot is formed in, and longitudinally along the extent of, an external cutting surface of a workpiece which comprises, a longitudinally extending trough having a forward surface, a channel formed within said trough longitudinally along the extent of said forward surface, said channel being open to said forward surface and at each longitudinal end of said trough member, means for positioning the forward surface of said trough member in operable engagement with the external cutting surface of said workpiece along its entire longitudinal extent so that the channel formed in the trough member and the cutting surface provide a substantially enclosed longitudinal path along the longitudinal extent of the external cutting surface within and along which a cutting wire of the electrical discharge machining equipment longitudinally passes, said cutting wire haveing an axis which extends parallel to the external cutting surface and along the longitudinal extent of the channel, and said longitudinal path providing means for directing and confining the flow of dielectric fluid supplied thereto axially along the cutting wire so as to flush out and remove eroded particles formed during the cutting of a slot in the surface of the workpiece.

5. Apparatus as defined in claim 4 wherein said trough member includes means for supplying fluid to said channel transversely of said channel.

6. Apparatus as defined in claim 4 wherein said trough member includes means intermediate its longitudinal extent for draining excess fluid from said channel externally of said trough member.

7. Apparatus as defined in claim 4 wherein said channel formed within said trough member has a rectangular cross-sectional configuration.

8. Apparatus as defined in claim 4 wherein said channel formed in said trough member has an arcuate cross-sectional configuration.

* * * * *